(12) United States Patent
Schreiber

(10) Patent No.: US 7,485,846 B2
(45) Date of Patent: Feb. 3, 2009

(54) SCANNING MICROSCOPE AND METHOD FOR SCANNING MICROSCOPE

(75) Inventor: Frank Schreiber, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 11 days.

(21) Appl. No.: 11/236,245

(22) Filed: Sep. 27, 2005

(65) Prior Publication Data

US 2006/0065823 A1 Mar. 30, 2006

(30) Foreign Application Priority Data

Sep. 29, 2004 (DE) .................. 10 2004 047 820

(51) Int. Cl.
*H01J 3/14* (2006.01)
*H01J 5/16* (2006.01)
*H01J 40/14* (2006.01)

(52) U.S. Cl. ............ 250/234; 250/227.22; 250/201.3; 356/318; 359/388; 359/222

(58) Field of Classification Search .......... 250/234, 250/227.22, 201.3; 356/318; 359/388, 222
See application file for complete search history.

(56) References Cited

U.S. PATENT DOCUMENTS

| | | | | |
|---|---|---|---|---|
| 3,711,791 A * | 1/1973 | Erickson | .............. | 372/10 |
| 4,461,005 A * | 7/1984 | Ward et al. | .............. | 372/10 |
| 5,377,003 A * | 12/1994 | Lewis et al. | .............. | 356/300 |
| 5,841,139 A * | 11/1998 | Sostek et al. | .............. | 250/339.12 |
| 5,886,784 A | 3/1999 | Engelhardt | | |
| 5,932,871 A * | 8/1999 | Nakagawa et al. | ....... | 250/201.3 |
| 6,121,616 A * | 9/2000 | Trigg | .............. | 250/339.07 |
| 6,253,007 B1 * | 6/2001 | Laughlin | .............. | 385/34 |
| 6,519,382 B1 * | 2/2003 | Jurbergs et al. | .............. | 385/18 |
| 6,525,812 B1 * | 2/2003 | Hartmann et al. | .............. | 356/318 |
| 6,555,811 B1 * | 4/2003 | Amos | .............. | 250/234 |
| 2002/0036824 A1 * | 3/2002 | Sasaki | .............. | 359/385 |
| 2003/0103210 A1 * | 6/2003 | Rapp et al. | .............. | 356/456 |
| 2003/0107732 A1 * | 6/2003 | Sasaki et al. | .............. | 356/318 |
| 2004/0156102 A1 * | 8/2004 | Boehm et al. | .............. | 359/388 |
| 2005/0161593 A1 * | 7/2005 | Kitahara | .............. | 250/234 |

FOREIGN PATENT DOCUMENTS

DE 43 30 347 A1 3/1995
EP 0 495 930 4/1999

* cited by examiner

*Primary Examiner*—Seung C Sohn
(74) *Attorney, Agent, or Firm*—Houston Eliseeva LLP

(57) ABSTRACT

A scanning microscope with a first and at least one other detection channel is disclosed. The first detection channel comprises at least one first detector and the other detection channel comprises at least one other detector to detect the detection light given off by a sample. A switching mechanism is provided that selectively directs the detection light into the first or into the other detection channel.

30 Claims, 4 Drawing Sheets

SCANNING MICROSCOPE AND METHOD FOR SCANNING MICROSCOPE

RELATED APPLICATIONS

This application claims priority to German patent application number DE 10 2004 047 820.1, filed Sep. 29, 2004, which is incorporated herein by reference in its entirety.

BACKGROUND OF THE INVENTION

The invention relates to a scanning microscope with a first and at least one other detection channel, whereby the first detection channel comprises at least one first detector and the other detection channel at least one other detector to detect a detection light beam given off by a sample.

The invention additionally relates to a method for examining a sample using a scanning microscope.

In scanning microscopy, a sample is illuminated with a light beam in order to observe the reflection or fluorescent light emitted by the sample. The focus of an illumination light beam is moved in an object plane with the help of a controllable beam deflector, generally by tipping two mirrors, whereby the axes of deflection are usually positioned perpendicular to each other, so that one mirror deflects in the x-direction and the other in the y-direction. The mirrors are tipped with the help, for example, of galvanometric positioners. The power of the light coming from the object is measured dependent on the position of the scanning beam. Generally, the positioners are provided with sensors to determine the actual position of the mirrors.

In confocal scanning microscopy in particular, an object is scanned in three dimensions with the focus of a light beam.

A confocal scanning microscope generally comprises a light source, a focusing optic with which the light from the source is focused on a pinhole aperture—the so-called excitation aperture—, a beam splitter, a beam deflector to control the beam, a microscope optic, a detection aperture, and detectors to detect the detection or fluorescent light. The illumination light is often coupled via the beam splitter which, for example, may be implemented as a neutral beam splitter or as a dichroic beam splitter. Neutral beam splitters have the disadvantage that a great deal of excitation or detection light is lost, depending upon the splitting ratio.

The fluorescent or reflection light coming from the object goes back to the beam splitter via the beam deflector, passes through it, and finally focuses on the detection aperture, behind which are the detectors. Detection light that does not originate directly from the focal region takes another light path and does not pass through the detection aperture, so that pixel information is obtained that leads to a three-dimensional image as a result of sequential scanning of the object. In most cases, a three-dimensional image is achieved by layered data imaging, whereby the path of the scanning light beam ideally describes a meander on or in the object. (Scanning a line in the x-direction at a constant y-position, then interrupting x-scanning and y-repositioning to the next line to be scanned, and then scanning this line at a constant y-position in negative x-direction, etc.). To enable layered data imaging, the sample table or the objective is repositioned after scanning a layer so that the next layer to be scanned is brought into the focal plane of the objective.

In many uses, samples are prepared with several markers, such as several different fluorescent dyes. These dyes can be sequentially excited, for example by illumination light beams exhibiting different excitation wavelengths. Simultaneous excitation by an illumination light beam that comprises light of several excitation wavelengths is also the norm. An arrangement with a single laser that emits several laser lines is known from the European patent application EP 0 495 930, "Confocal Microscope System for Multiple Color Fluorescence." Currently, such lasers are mostly implemented as mixed gas lasers, particularly as ArKr lasers.

Multiple band detectors are often used to detect detection light coming from the sample. A device to select and detect at least two spectral regions of a light beam with a selector and detector is known from published application DE 433-0347 A1. The device is designed for reliable and simultaneous selection and detection of varying spectral regions at high yield and with the simplest construction such that the selector component for spectral fanning out of the light beam—for example a prism or a grid—and a means for blocking a first spectral region, on the one hand, and for reflecting at least a portion of the non-blocked spectral region, and the detector comprises a first detector arranged in the beam path of the blocked spectral region and a second detector arranged in the beam path of the reflected spectral region. Preferably, a slit diaphragm with mirrored aperture walls is implemented to block out a first spectral region and on the other hand to reflect at least a portion of the non-blocked spectral region. In particular, the device may be used as a multiband detector in a scanning microscope.

SUMMARY OF THE INVENTION

The task of the present invention is to disclose a scanning microscope that makes possible the use of the optimal detector types in the most flexible manner—especially while scanning a sample.

This task is solved by a scanning microscope characterized in that a switching mechanism is provided that selectively directs the detection light into the first and/or into the other detection channel.

A further task of the present invention is to disclose a method to examine a sample with a scanning microscope that makes possible the largely flexible and efficient detection of detection light coming from the sample.

The further task is solved by a method that is characterized by the following steps:
  generating an overview image of a sample;
  determining at least one region within the overview image;
  illuminating the sample with illumination light;
  detecting the detection light coming from the sample, whereby the detection light coming from the region is deflected into a first detection channel and at least a part of the remaining detection light is deflected into a further detection channel.

Advantageously, switching back and forth between different detection channels is very fast according to the invention—even within an image, preferably even precisely to the pixel. The operator may first preferably generate an overview image and mark therein (for example with a pointing mechanism like a computer mouse) which detection channel is to be used for which region of the sample. It is thus, for example, possible to detect very weak fluorescent regions with an avalanche photo diode (APD) while simultaneously detecting the total spectrum of the detection light for other lighter regions (for example using a spectrometer as the detector). The lifetime of the sample dyes can be determined at another place (another region) by taking fluorescence lifetime measurements.

In a preferred embodiment of the invention, the scanning microscope comprises a scanning device, whereby the switching mechanism directs the detection light into the first or into the other detection channel depending on the particular scanning position.

Preferably, a sample can be scanned pixel by pixel with the scanning microscope, whereby the switching mechanism directs the detection light coming from adjacent pixels into different detection channels. In a further variant, a sample is scanned line by line, whereby the switching mechanism directs the detection light coming from adjacent scan lines into different detection channels.

In a particularly preferred variant, random regions (pixels, lines, surfaces, volumes) may be selected, preferably of freely selectable boundaries, and each selected region can be assigned to one or several detection channels.

In one particular embodiment of the invention, an adjustable beam deflector is provided. The switching mechanism directs the detection light in this variant into the first or into the other detection channel, depending on the deflecting position of the beam deflector.

Preferably, the first detector and/or the other detector comprises a photomultiplier, and/or a photo diode, and/or a CCD, and/or an EMCCD, and/or an avalanche photo diode, and/or a spectrometer, and/or a multiband detector.

Advantageously, the first detector and the other detector may be of different detector types.

In a preferred embodiment of the invention, the switching mechanism comprises an optical shutter, particularly for switching quickly between the detection channels. This uses the effect of frustrated total reflection. A slit approximately 0.5 µm in breadth between a first optical body and a second optical body (preferably glass prisms) can, for example, be closed and opened with the help of piezoelectric positioning elements, whereby it is possible to switch between total reflection at an interface and the coupling to a detection channel associated with it, and transmission via the interface and the coupling to the other detection channel associated with it. The degree of reflection can be adjusted by adjusting the relative distance between the first and second optical body. This makes it possible simultaneously to direct a preset portion of the detection light into a detection channel and another portion into another detection channel. An adjustment mechanism is preferably provided to adjust the relative distance, which can—as already mentioned—comprise piezoelectric positioning elements. The adjustment mechanism can, for example, also comprise a sliding table that is preferably motor-driven.

The effect of frustrated total reflection is almost completely independent of wavelength and polarization so that a switching mechanism that works on this principle is particularly advantageous for use in a scanning microscope.

The switching mechanism in another variant comprises a swing mirror and/or rotating mirror. In a further embodiment of the invention, the switching mechanism comprises an acoustical optical component, in particular an AOM.

The scanning microscope is preferably formed as a confocal scanning microscope.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

The subject of the invention is depicted schematically in the diagram and is described below on the basis of the following figures, whereby components that function in the same manner are given the same reference numbers. They show.

DETAILED DESCRIPTION OF THE PREFERRED EMBODIMENTS

Figure 1:
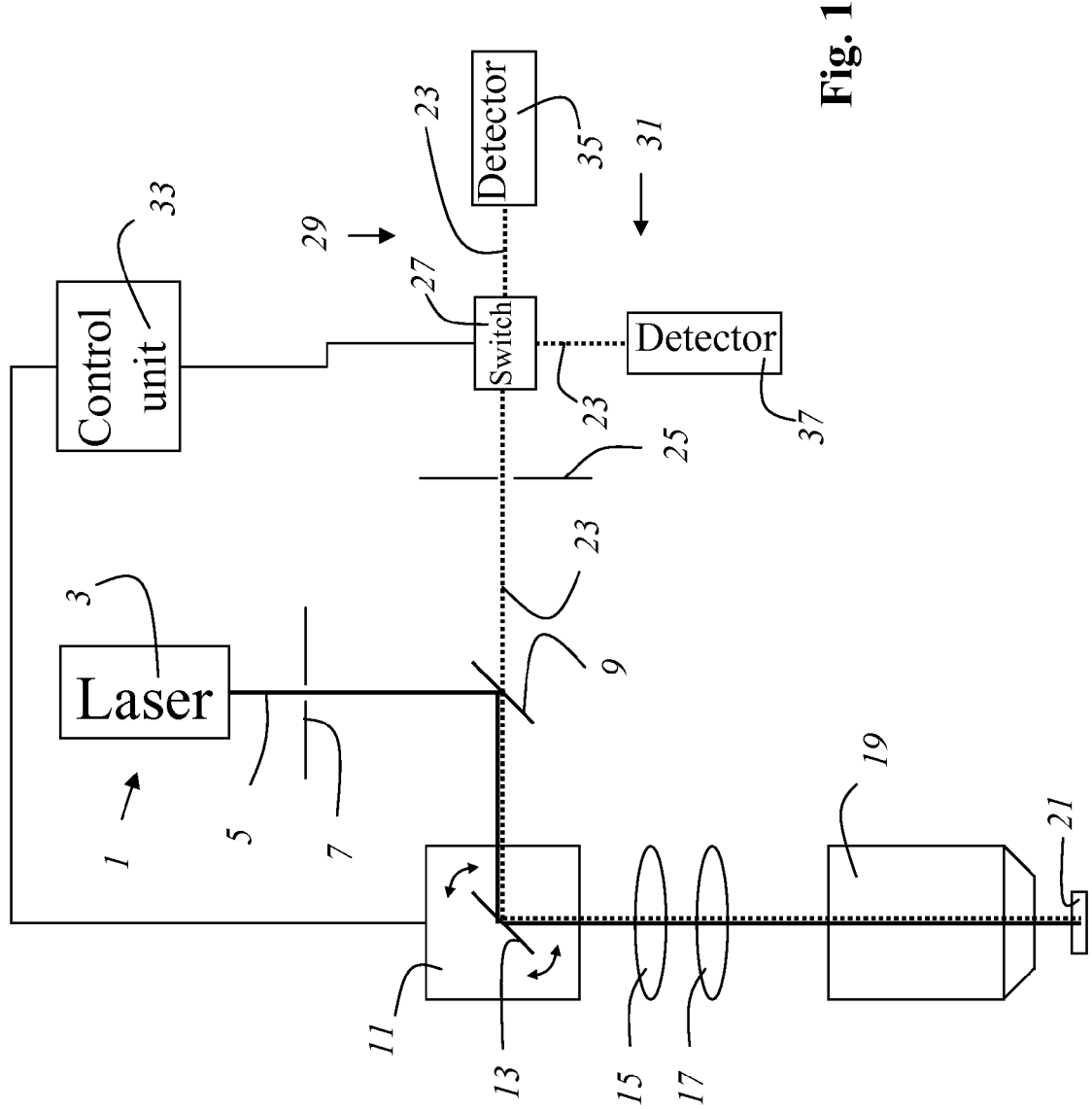
FIG. 1 a scanning microscope according to the invention.

FIG. 1 shows a scanning microscope according to the invention that is formed as a confocal scanning microscope. The scanning microscope exhibits an illumination light source 1 that is implemented as a multiline laser 3 and that generates an illumination light beam 5. The illumination light beam 5 passes through the illumination pinhole aperture 7 and is subsequently directed via a primary beam splitter 9 that is formed as a dichroic filter to a beam deflector 11 that comprises a cardanically mounted scanning mirror 13. The beam deflector 11 sends the illumination light beam 5 through the scanning optic 15, the tube optic 17, and through the objective 19 over or through the sample 21. The illumination light beam 5 is represented in the figure by solid lines. The detection light 23 (e.g., reflection light or fluorescent light) coming from the sample proceeds along the same light path, namely through the objective 19, the tube optic 17, and through the scanning optic 15 back to the beam deflector 11, which deflects the detection light 23 back to the primary beam splitter 9. The detection light 23 passes the primary beam splitter 9 and the ensuing detection pinhole aperture 25 and subsequently reaches a switching mechanism 27 that selectively directs the detection light 23 into a first detection channel 29 and/or into a further detection channel 31. The detection light 23 is represented in the figure by broken lines. The switching mechanism 27 is controlled by an electronic control unit 33 and directs the detection light 23 into the first detection channel 29 or into the other detection channel 31 independently of the deflection position of the beam deflector 11, which is also controlled by the control unit 33. The first detection channel 29 comprises a first detector 35 that is implemented as a photomultiplier. The other detection channel 31 comprises another detector 37 that is implemented as an avalanche photo diode.

Figure 2:
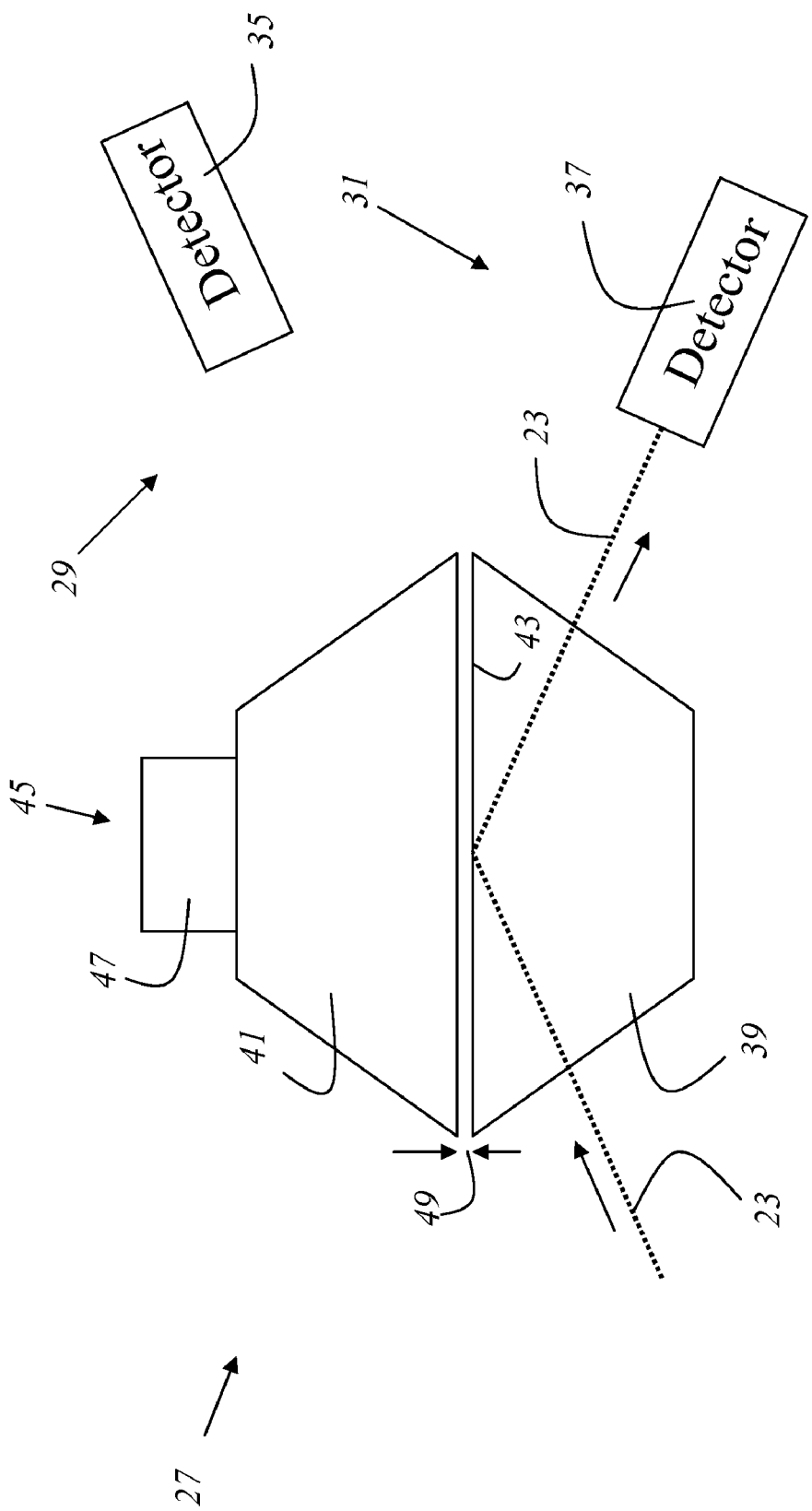
FIG. 2 a detail view of a scanning microscope according to the invention.

FIG. 2 shows a detail view of a scanning microscope according to the invention, in particular a variant of a switching mechanism 27 that selectively directs the detection light 23 into a first detection channel 29 and/or into another detection channel 31. The switching mechanism shown here could, for example, be a component of the scanning microscope shown in FIG. 1. The switching mechanism 27 exhibits a first optical body 39 and a second optical body 41, whose relative distance 49 is adjustable. The first optical body 39 and the second optical body 41 are each formed as glass prisms. The first optical body exhibits an interface 43 off of which the detection light can be totally reflected. An adjustment mechanism 45 that comprises a piezoelectric element 47 is provided to adjust the relative distance 49 between the first optical body 39 and the second optical body 41. The second optical body 41 can be made to approach the interface 43 of the first optical body by the piezoelectric element 47. At a relative distance 49 of 0.5 μm the detection light 23 is largely totally reflected off of the interface 43, and reaches the other detection channel 31, that comprises a further detector 37 to detect the detection light 23. In the position shown, the first detector 35 of the first detection channel 29 receives no detection light 23.

Figure 3:
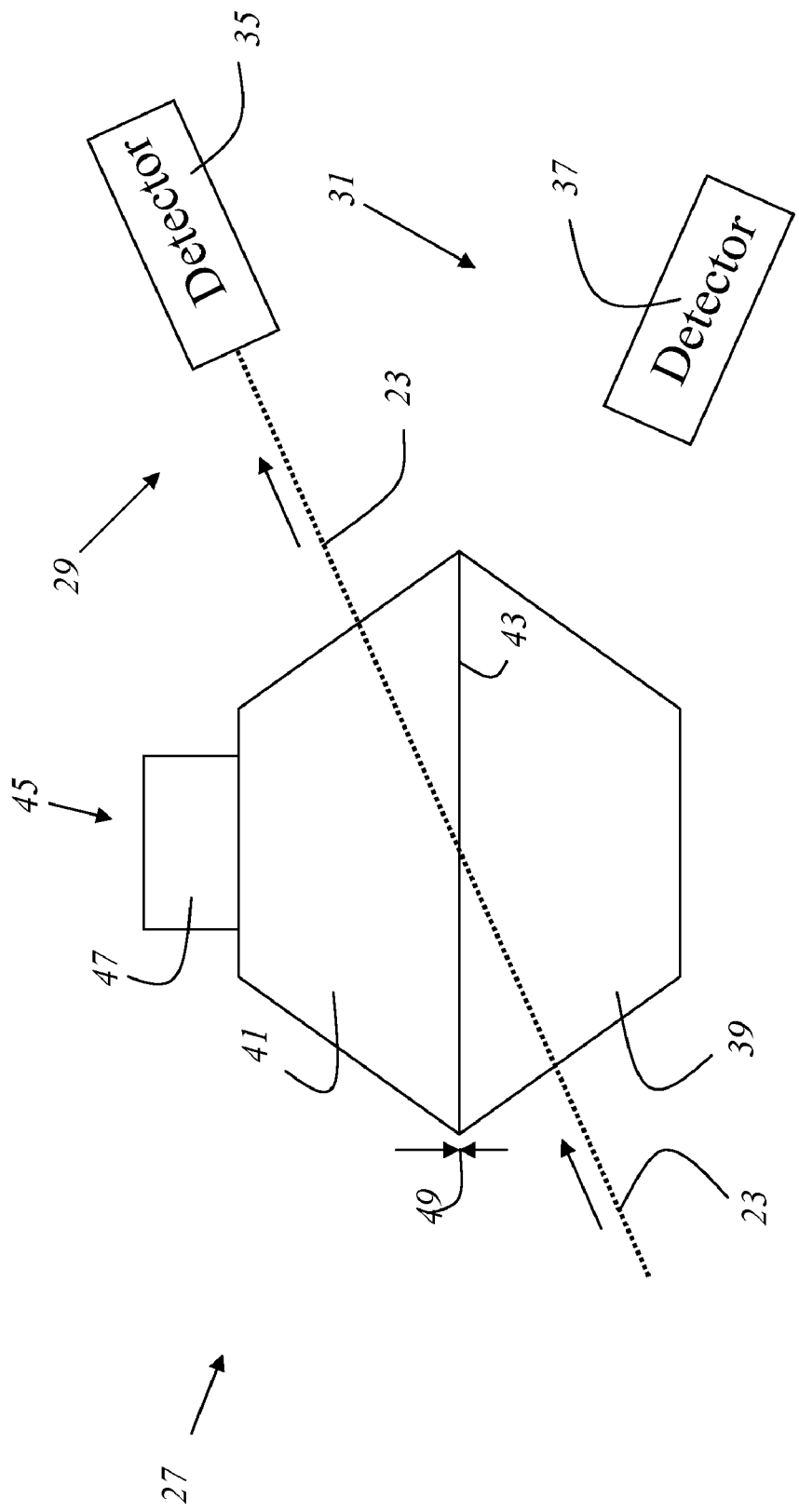
FIG. 3 a detail view of a scanning microscope according to the invention.

FIG. 3 shows the detail view familiar from FIG. 2, however with the relative distance 49 decreased to zero. In this position, almost no reflection light 23 is reflected off of the interface 43 so that the detection light 23 passes through both the first optical body 39 and the second optical body 41 and into the first detection channel 29, which comprises a first detector 35 to detect the detection light 23.

Figure 4:
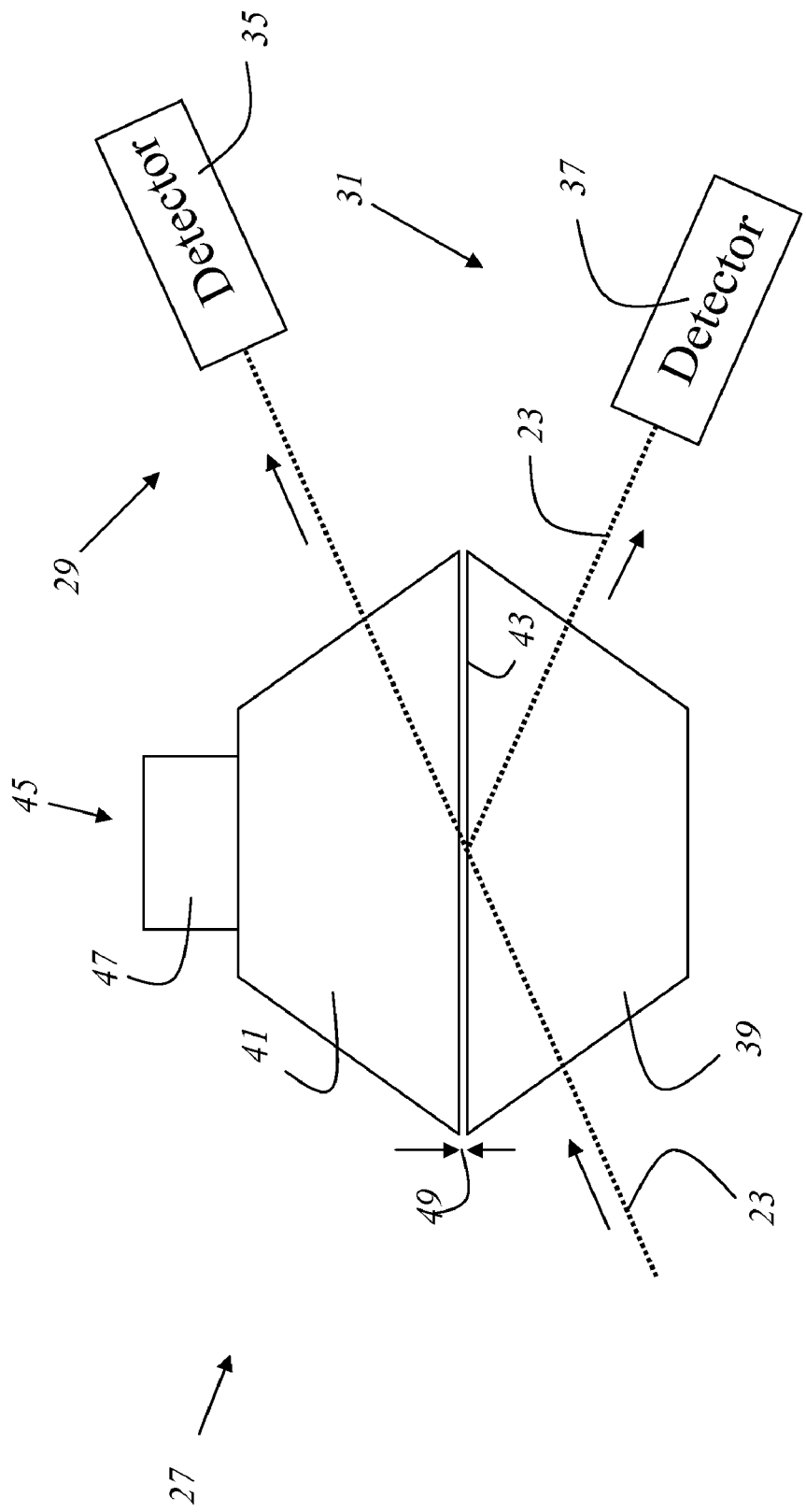
FIG. 4 a further detail view of a scanning microscope according to the invention.

FIG. 4 shows the detail view familiar from FIG. 2, however, with a relative distance 49 selected such that a portion of the detection light 23 is totally reflected and deflected into the other detection channel 31, while another portion of the detection light 23 passes through both the first optical body 39 and the second optical body 41 and reaches the first detection channel 29. The degree of reflection is adjustable by varying the relative distance 49 between the first and second optical body.

The invention is described in relation to a particular embodiment. However, it is clear that changes and variations can be implemented without abandoning the scope of the following claims.

While this invention has been particularly shown and described with references to preferred embodiments thereof, it will be understood by those skilled in the art that various changes in form and details may be made therein without departing from the scope of the invention encompassed by the appended claims.

What is claimed is:

1. A scanning microscope comprising:
    a first detection channel and at least one other detection channel, the first detection channel comprising a first detector and at least one other detection channel comprising another detector to detect detection light coming from a sample;
    a beam deflector; and
    a switching mechanism comprising a first optical body and a second optical body for selectively directing the detection light into the first detection channel or into at least one other detection channel or into the first and at least one other detection channels depending on an adjustable distance between the first and the second optical bodies, but independently of a deflection position of the beam deflector,
    wherein the scanning microscope comprises a scanning device and wherein the switching mechanism by adjusting the distance between the first and the second optical bodies in response to a control signal directs the detection light into the first or into at least one other detection channel depending on a scanning position of the scanning device.

2. The scanning microscope according to claim 1, wherein the switching mechanism directs the detection light coming from adjacent pixels into different detection channels during a pixel-by-pixel scan of the sample by the scanning microscope.

3. The scanning microscope according to claim 1, wherein the switching mechanism directs the detection light coming from adjacent scanned lines into different detection channels during a line-by-line scan of the sample by the scanning microscope.

4. The scanning microscope according to claim 1, characterized in that the first detector and at least one other detector comprise a photomultiplier, or a photodiode, or a CCD, or an EMCCD, or an avalanche photo diode, or a spectrometer, or a multiband detector.

5. The scanning microscope according to claim 1, wherein the first detector and at least one other detector are different detector types.

6. The scanning microscope according to claim 1, wherein a mechanism to generate an overview image is provided.

7. The scanning microscope according to claim 1, wherein the switching mechanism comprises an optical shutter.

8. The scanning microscope according to claim 1, wherein the switching mechanism operates according to the principle of frustrated total reflection.

9. The scanning microscope according to claim 1, wherein the first optical body has an interface off of which the detection light can be totally internally reflected.

10. The scanning microscope according to claims 1, wherein the first optical body has an interface off of which the detection light can be totally internally reflected, whereby the degree of reflection is adjustable by varying the distance between the first and the second optical body.

11. The scanning microscope according to claim 1, wherein an adjustment mechanism is provided to adjust the relative distance.

12. The scanning microscope according to claim 11, wherein the adjustment mechanism comprises a piezoelectric element.

13. The scanning microscope according to claim 1, wherein the first optical body and/or the second optical body are formed as prisms.

14. The scanning microscope according to claim 1, wherein the scanning microscope is a confocal scanning microscope.

15. The scanning microscope according to claim 1, wherein fluorescent dyes are used for generating the detection light.

16. A method for examining a sample with a scanning microscope, characterized by the following steps:
    providing a scanning microscope with a beam deflector, a switching mechanism comprising a first optical body and a second optical body disposed at a distance from the first optical body;
    generating an overview image of the sample;
    determining at least one region within the overview image;
    illuminating the sample with an illumination light;
    detecting the detection light coming from the sample by adjusting the distance between the first and the second optical bodies and selectively directing a the detection light from the region into a first detection channel, or into another detection channel, or into the first and the other detection channels independently of a deflection position of the beam deflector; and
    providing a scanning device and directing by adjusting the distance between the first and the second optical bodies in response to a control signal the detection light into the first or into the other detection channel depending upon a scanning position.

17. The method according to claim 16, wherein the first detection channel comprises at least one first detector and the other detection channel comprises at least one other detector to detect detection light.

18. The method according to claim 17, wherein the first detector or the other detector comprise a photomultiplier, or a photodiode, or a CCD, or an EMCCD, or an avalanche photo diode.

19. The method according to claim 17, wherein the first detector and the other detector are of different types.

20. The method according to claim 16, further comprising scanning the sample pixel by pixel, and directing the detection light from adjacent pixels into different detection channels.

21. The method according to claim 16, further comprising scanning the sample line by line, and directing the detection light from adjacent scanned lines into different detection channels.

22. The method according to claim 16, wherein the switching mechanism comprises an optical shutter.

23. The method according to claim 16, wherein the switching mechanism operates according to the principle of frustrated total reflection.

24. The method according to claim 16, wherein the first optical body has an interface off of which the detection light can be totally internally reflected.

25. The method according to claim 16, wherein the first optical body has an interface off of which the detection light can be totally internally reflected, whereby the degree of reflection is adjustable by varying the distance between the first and the second optical body.

26. The method according to claim 16, wherein an adjustment mechanism is provided to adjust the relative distance.

27. The method according to claim 26, wherein the adjustment mechanism comprises a piezoelectric element.

28. The method according to claim 16, wherein the first optical body and/or the second optical body is formed as a prism.

29. The method according to claim 16, wherein the scanning microscope is a confocal scanning microscope.

30. The method according to claim 16, wherein further comprising using fluorescent dyes for generating the detection light.

* * * * *